(12) United States Patent
Howell et al.

(10) Patent No.: US 11,931,950 B2
(45) Date of Patent: Mar. 19, 2024

(54) MACHINE LEARNING INFORMED CONTROL SYSTEMS FOR EXTRUSION PRINTING PROCESSES

(71) Applicant: Lawrence Livermore National Security, LLC, Livermore, CA (US)

(72) Inventors: Brian Howell, Livermore, CA (US); Brian Giera, Oakland, CA (US); Maxwell Murialdo, Westminster, CA (US); Kyle Sullivan, Brentwood, CA (US)

(73) Assignee: LAWRENCE LIVERMORE NATIONAL SECURITY, LLC, CA (US)

( * ) Notice: Subject to any disclaimer, the term of this patent is extended or adjusted under 35 U.S.C. 154(b) by 1142 days.

(21) Appl. No.: 16/562,253

(22) Filed: Sep. 5, 2019

(65) Prior Publication Data

US 2020/0101670 A1 Apr. 2, 2020

Related U.S. Application Data

(60) Provisional application No. 62/746,489, filed on Oct. 16, 2018, provisional application No. 62/739,068, filed on Sep. 28, 2018.

(51) Int. Cl.
*G06N 3/02* (2006.01)
*B29C 64/106* (2017.01)
(Continued)

(52) U.S. Cl.
CPC .......... *B29C 64/106* (2017.08); *B29C 64/393* (2017.08); *B33Y 10/00* (2014.12);
(Continued)

(58) Field of Classification Search
CPC ........... G06N 3/02; G06N 3/008; B33Y 10/00
See application file for complete search history.

(56) References Cited

U.S. PATENT DOCUMENTS

| 10,571,893 | B2* | 2/2020 | Halperin | ................. G06F 30/00 |
|---|---|---|---|---|
| 2016/0193785 | A1 | 7/2016 | Bell et al. | |
| 2016/0236414 | A1* | 8/2016 | Reese | .................... B33Y 50/02 |
| 2017/0050382 | A1 | 2/2017 | Minardi et al. | |

(Continued)

FOREIGN PATENT DOCUMENTS

| WO | WO-2016038356 A1 * | 3/2016 | ............. A61K 47/10 |
|---|---|---|---|

OTHER PUBLICATIONS

Zohdi (Dynamic thermomechanical modeling and simulation of the design of rapid free-form 3D printing processes with evolutionary machine learning, Dec. 2017, pp. 343-362) (Year: 2017).*

(Continued)

*Primary Examiner* — George Giroux
(74) *Attorney, Agent, or Firm* — Perkins Coie LLP (57) ABSTRACT

Systems and methods for controlling a material extrusion device to extrude a filament of an ink are provided. An extrusion printing control system collects from one or more sensors measurements representing an internal state of material extrusion processing during extrusion of the filament. In addition, the system collects an image of the filament as the filament is extruded. The system applies a classifier to the collected image to generate an image-derived state characterizing the filament. Based on the internal state and the image-derived state, the system estimates a derived state using a model. The system determines control parameters using the model to achieve a desired quality of the filament by minimizing a cost function based on the internal state, the image-derived state, the derived state, and constraints of the material extrusion device. Finally, the system provides the control parameters to a controller of the material extrusion device.

17 Claims, 5 Drawing Sheets

(51) Int. Cl.
*B29C 64/393* (2017.01)
*B33Y 10/00* (2015.01)
*B33Y 50/02* (2015.01)
*G06F 18/24* (2023.01)
*G06N 3/008* (2023.01)
*G06N 20/00* (2019.01)
*G06V 10/44* (2022.01)
*G06V 10/764* (2022.01)
*G06V 10/82* (2022.01)

(52) U.S. Cl.
CPC .............. *B33Y 50/02* (2014.12); *G06F 18/24* (2023.01); *G06N 3/008* (2013.01); *G06N 3/02* (2013.01); *G06N 20/00* (2019.01); *G06V 10/454* (2022.01); *G06V 10/764* (2022.01); *G06V 10/82* (2022.01)

(56) References Cited

U.S. PATENT DOCUMENTS

2018/0162066 A1\* 6/2018 Bruwer .............. G05B 19/4099
2018/0215094 A1 8/2018 Birnbaum et al.
2019/0299536 A1\* 10/2019 Putman .................. B22F 10/10

OTHER PUBLICATIONS

Jaiswal et al. (Build orientation optimization for additive manufacturing of functionally graded material objects, Jan. 2018, pp. 223-235) (Year: 2018).\*
Lu et al. (A Layer-To-Layer Model and Feedback Control of Ink-Jet 3-D Printing, Jun. 2015, pp. 1056-1068) (Year: 2015).\*
International Search Report and Written Opinion dated Jan. 9, 2020 in International Application No. PCT/US19/50063, 10 pages.

\* cited by examiner

MACHINE LEARNING INFORMED CONTROL SYSTEMS FOR EXTRUSION PRINTING PROCESSES

CROSS-REFERENCE TO RELATED APPLICATION

This application claims the benefit of U.S. Provisional Application No. 62/739,068, titled MACHINE LEARNING INFORMED CONTROL SYSTEMS FOR EXTRUSION PRINTING PROCESSES, filed on Sep. 28, 2018, and U.S. Provisional Application No. 62/746,489, titled MACHINE LEARNING INFORMED CONTROL SYSTEMS FOR EXTRUSION PRINTING PROCESSES, filed on Oct. 16, 2018, which are incorporated by reference herein in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Current manufacturing techniques rely in large part on computers to control the equipment (e.g., machines) used to manufacture products. As an example, in a mass production line to assemble a product (e.g., an automobile), computers control robotic arms that position components in place, weld the components together, polish the welds, and so on. The computers may be connected to many different types of sensors to ensure that the product is being assembled to specification. For example, when positioning a component, a computer may determine that a component is correctly positioned based on data received from an optic sensor and, when the component is positioned correctly, control the robotic arm to start welding. After the welding is complete, the computer may determine whether the weld meets acceptable quality standards based on various measurements received from sensors that, for example, measure the height, width, and length of the weld or measure the temperature of the welder during the welding process. If the weld does not meet the acceptable quality standards, the computer may direct a conveyor to divert the product from the assembly line for corrective action and may alert a technician to perform maintenance on the welder or robotic arm.

Manufacturing is currently evolving to meet the need to develop custom products rapidly. For example, a company that is manufacturing a product may need a component that is not readily available. The company may have the component custom-made at a shop that specializes in making custom products layer by layer. The shop may employ additive manufacturing techniques to build up custom products. To build a custom product, the specifications (e.g., dimensions and materials) are supplied to a computer that controls the repeated adding of raw material to build up the custom product. Additive manufacturing techniques (sometimes referred to as 3-D printing) include extrusion deposition, sintering of granular material, lamination, photopolymerization, and so on.

Extrusion-based printing processes can be subdivided into direct-ink writing (DIW) and fused deposition modeling (FDM). Both extrusion processes are additive-manufacturing methods that allow for customizable materials to be 3D-printed into arbitrarily shaped parts. DIW printing exploits the rheological properties of shearing-thinning fluids that exhibit a yield stress by extruding a material as a liquid, which subsequently solidifies once shear forces are no longer applied. Current DIW printing uses a computer-controlled translation stage that moves relative to a nozzle allowing for predetermined paths of the ink to be deposited onto the stage. FDM printing is a similar method that exploits the melting point of thermoplastics to produce a shear-thinning fluid that can be extruded from a nozzle and subsequently solidified once cooled to the ambient temperature.

Although many materials can be developed into inks that fit the specifications required for extrusion printing, the variation in ink preparation and the resulting complex rheological properties make precision fluid control difficult to manage. Frequent starts and stops in fluid flow are often required for optimal tool paths but are difficult to achieve due to varying compliance (i.e., ease of deformation) within the system or response times for different inks. Over or under extrusion of the ink relative to the speed of the translation stage will cause irregular filament sizes and produce varying defects throughout a given print. The distance between the nozzle tip and the substrate (i.e., the plate onto which the filament is deposited), referred to as "z-height," also contributes to the shape of extruded filaments. For example, at a z-height equal to or greater than the diameter of the nozzle, the filaments assume a cylindrical shape. If the z-height is smaller than the diameter of the nozzle, the filaments are squashed down and balloon to the sides of the nozzle. Moreover, disturbances such as air bubbles and clogs are catastrophic to the printing process as they introduce voids to the part or completely halt the printing process all together.

Current methods to combat these issues involve a conventional proportional-integral-derivative (PID) servo loop for extrusion control. Extrusion actuation is generated by a ball screw servo motor and the feedback loop takes voltage or current as the control input and linear displacement of the ink within the reservoir as the control output. More sophisticated research has been performed by implementing on-off (or "bang-bang") controllers or modeling DIW system dynamics and implementing predictive algorithms (e.g., model predictive control) to control extrusion rate or to abort printing altogether. Although these methods may improve the extrusion process, the user is still required to manually determine printing parameters (e.g., stage speed, extrusion rate, and z-height) and monitor for air bubbles or clogs. Relying on humans to monitor the system continuously is too expensive and often unreliable since raw data is often difficult (even for experts) to interpret on the fly. Further, this requirement for human involvement severely limits the scalability of extrusion-based printing processes.

DETAILED DESCRIPTION

Methods and systems for automatically controlling an additive manufacturing system are provided. The additive manufacturing system is described primarily in the context of techniques used to control extrusion printing (e.g., DIW). These techniques, however, can be applied to other types of additive manufacturing such as power bed fusion and vat photopolymerization. In some embodiments, an extrusion printing control (EPC) system collects one or more measurements using a plurality of sensors that monitor material extrusion processing of a material extrusion device. Each measurement represents an internal state of the material extrusion processing during extrusion of a filament of an ink. Additionally, the EPC system collects an image of the filament using a high-speed camera as the filament is extruded. The EPC system applies a classifier to the collected image to generate an image-derived state, which includes thickness, continuity, color, area, perimeter, defects, and other variables that characterize the filament. The classifier is trained using images that are collected during operation of the material extrusion device and labeled with image-derived state data (e.g., an indication of an air bubble, a clog, or other defects in the filament). The EPC system then estimates a derived state using a model based on the internal state and the image-derived state. The derived state includes variables that cannot be directly measured with sensors, such as the shear stress within the tubing and nozzle, the friction on the servo dynamics, and the friction of the plunger sliding against the wall of the syringe, etc.

Based on the internal state, the image-derived state, and the derived state, the EPC system uses the model to determine optimal control parameters to achieve a desired filament quality and/or total printing time. The EPC system determines the optimal control parameters by minimizing a cost function given constraints of the material extrusion device, such as how much force can be applied by the plunger, how fast the nozzle can move, and so on. The cost function represents the cost of not matching a blue print for the product being manufactured. The blue print may include information such as whether the cross section of the filament should be circular or rectangular, a desired density of the product (i.e., spacing between filament cylinders), and a desired total printing time. Finally, the EPC system provides the control parameters to a controller of the material extrusion device to make control moves necessary to achieve the desired filament quality and/or total printing time. For example, the EPC system may direct the controller of the material extrusion device to move the nozzle away from the product during printing and dump the material until the disturbances pass. Other example control moves include adjusting the extrusion rate, stage speed, z-height, and UV-light modulation.

The EPC system implements closed-loop control in extrusion printing processes by utilizing sensors and machine learning for the state estimation, and optimal control algorithms for the optimization of the control parameters. Based on measurements and estimations of the states of the material extrusion processing, the EPC system implements a control move, which is followed by subsequent measurements and estimations. This process is iteratively repeated to regulate the filament quality and/or total printing time. In this way, the EPC system allows for real-time monitoring and control that are necessary for long production runs without human intervention. Moreover, the EPC system allows for rapid development of new printing materials by expediting the process of determining optimal print conditions (e.g., stage speed, extrusion rate, and z-height).

In some embodiments, the EPC system employs various sensors that obtain state variables at specific time intervals and provide in-situ monitoring of the material extrusion processing. These process-monitoring sensors include a voltage and current meter, a flow meter, a substrate scale, a thermocouple, an interferometer, a hyperspectral imager, an attenuated total reflectance (ATR) spectrometer, a high-speed video camera, etc. The combination of these sensors provides the system with information on the internal state of the material extrusion processing during extrusion of a filament of an ink, including how the rheology of the ink is changing with supplied inputs, how the flow properties are changing with time, and printer responses such as stage velocity, nozzle position, and linear actuator displacement velocity. For example, the EPC system may employ an interferometer that is used for various modes of actuation (e.g., pressure and linear actuation) for tracking linear displacement of the plunger, which is in turn closely related to the extrusion rate. As another example, the EPC system may collect real-time flow measurements from a non-invasive probe placed around the fluid tubing which emits ultrasonic frequencies. A sensor on the opposite side of the tubing measures the frequency shift (doppler effect) to compute a flow velocity, and the volumetric flow rate is derived from the diameter of the tubing. Other measurements collected by the sensors include current supply to the actuator, force applied to the plunger, and printer responses such as stage velocity, nozzle position, and linear actuator displacement velocity. These measurements provide intuition for the EPC system to make regulatory control moves in anticipation for upstream disturbances such as air bubbles and clogs.

Considering the suite of available extrusion sensors, the EPC system can collect vast amounts of in-situ sensor data representing an internal state and image-derived state of the material extrusion processing at a given moment in time. Making use of this data requires methods that can predict relevant diagnostic information about the state of printing. The EPC uses various machine learning techniques such as supervised, semi-supervised, unsupervised, and reinforcement learning. For instance, a trained machine learning algorithm may predict filament quality in terms of thickness, continuity, color, among other metrics that characterize the ink. Also, machine learning algorithms can be used to recognize and classify defects (e.g., air bubbles or clogs) within the product as it is being built. The EPC system can then use these machine learning predictions about the process and/or the product to implement the necessary rectification strategies to fix the extrusion process.

In some embodiments, the EPC systems uses a convolutional neural network (CNN) to classify defects within the product being built. A CNN is a type of neural network that has been developed specifically to process images. A CNN may be used to input an entire image and output a classification of the image. A CNN may include multiple convolution layers. Each convolution layer convolves small regions of the image using a kernel (or multiple kernels) to generate an activation for each region based on weights of neurons of the convolution layer learned during training. The activations may then be non-linearly transformed by a rectified linear unit ("ReLU"), and have their dimensions reduced using max pooling techniques before being input into the next convolution layer. The last layer may be fully connected in the sense that each activation that is input is connected to each neuron of the last layer. To generate training data, images are collected during operation of the material extrusion device as it manufactures products, such as during actual manufacturing, or during operation for the purpose of collecting training data. Each image may be labeled with image-derived state data indicating disturbances such as air bubbles or clogs and a corresponding spectral scan providing a height map and filament dimensions. The classifier is then trained using the training data that includes the images and their labels. To verify the accuracy of the classifier, a portion of the labeled images may be excluded from the training data to be used as test data during cross-validation of the classifier. After the classifier is trained, the EPC system uses the classifier to classify the images of the test data. The accuracy of the classifier can then be assessed based on the labels assigned to the images during classification and the labels assigned when the training data was labeled. The accuracy of the classifier may suffer, for example, because of "overfitting," resulting from an inadequate number or inadequate diversity of images for a certain disturbance. The complexity of the CNN may be selected based on a tradeoff between computational complexity and labeling accuracy. For example, if a more accurate labeling is desired, the number of layers (fully connected or not), kernels, neurons, and so on can be increased but at an increased computational expense.

In some embodiments, the EPC system uses a dynamic model to estimate a derived state based on the internal state and the image-derived state. Certain state variables are difficult to measure with sensors. As such, the EPC system uses a model to derive these variables based on the measured variables. For example, the model employs the following equations to estimate the shear stress within the tubing and nozzle ($\tau_{shear}$), the friction on the servo dynamics ($f_{sf}$), and the friction force of the plunger sliding against the wall of the syringe ($F_f \, \text{sgn}(\mu_{plung})$):

$$\frac{du_{plung}(t)}{dt} = \frac{K_{sc}}{\tau_s} I_{disp}(t) + \frac{K_{sf}}{\tau_s} F_{disp}(t) - \frac{1}{\tau_s} f_{sf} - \frac{1}{\tau_s} u_{plung}(t)$$

$$\frac{dF_{plung}}{dt} = \frac{(F_{plung}(t) - F_f + A_{plung} P_{atm})^2}{A_{plung} l_0 P_c(0)}$$

$$\left\{ u_{plung} - u_i \left[ \frac{F_{plung}(t) - F_f \, \text{sgn}(u_{plung})}{[A_{plung}]} \right] \right\}$$

$$\frac{du}{dt} = \frac{1}{m}(P_1 A_1 - P_{atm} A_2 - \tau_{shear} SA_{n+t})$$

where $\tau_s$ is the system time constant, is $\mu_{plung}$ is the plunger velocity, $K_{sc}$ is the system control gain, $K_{sf}$ is the system force gain, $I_{disp}$ is the input current, $F_{disp}$ is the dispenser force, $f_{sf}$ is the friction on the servo dynamics, $F_f \text{sgn}(\mu_{plung})$ is the friction of the plunger sliding against the wall, $F_f$ is the friction of both the servo dynamics and the plunger sliding against the wall of the syringe, $\mu_i$ is the velocity of the paste-air interface, $A_{plung}$ is the area of the plunger, $F_{plung}$ is the force applied by the plunger, $P_c(t)$ is the pressure of air bubbles at time t, $P_{atm}$ is the atmospheric pressure, $P_1$ is the pressure within the syringe, $l_0$ is the initial air bubble layer thickness, $A_1$ is the cross-sectional area of the tubing, $A_2$ is the cross-sectional area of the nozzle, $\tau_{shear}$ is the shear stress within the tubing and nozzle, and $SA_{n+t}$ is the surface area within the tubing and nozzle. The pressure of air bubbles ($P_c$) cannot be measured and therefore needs to be estimated while solving the equations. Some amount of air entrainment within the ink is impossible to fully remove and results in some compressibility of the entrained air. When the actuator pushes the plunger, there is a latency period in which the speed of the plunger and the resulting speed of the ink do not match up. This is due to the entrained air compressing and slowing down the actuation speed. The velocity of the paste-air interface ($\mu_i$) indicates the speed at which the ink is traveling right at that time. The above set of equations is only one of many ways to model the material extrusion process. Even a slight change to the configuration of the material extrusion device can affect what can be measured, which will invariably change the model. Different models can be developed for different configurations of the material extrusion device.

In some embodiments, the EPC system employs the model to determine control parameters to make regulatory moves relative to the current state to achieve a desired filament quality and printing speed. The EPC system employs the model to generate, for example, an optimal z-height, extrusion rate, and stage speed that minimize a cost function (e.g., minimize the eccentricity of the cross section of the filament) given constraints of the material extrusion device. The cost function represents the cost of not matching a blue print for the product being manufactured. The blue print may specify, for example, whether the cross section of the filament should be circular or rectangular, a desired density of the product (i.e., spacing between filament cylinders), and a desired total printing time. The constraints of the material extrusion device may include, for example, how much force can be applied by the plunger, how fast the nozzle can move, and so on. The control parameters are then fed to the controller of the material extrusion device to make the necessary corrective actions.

Figure 1:
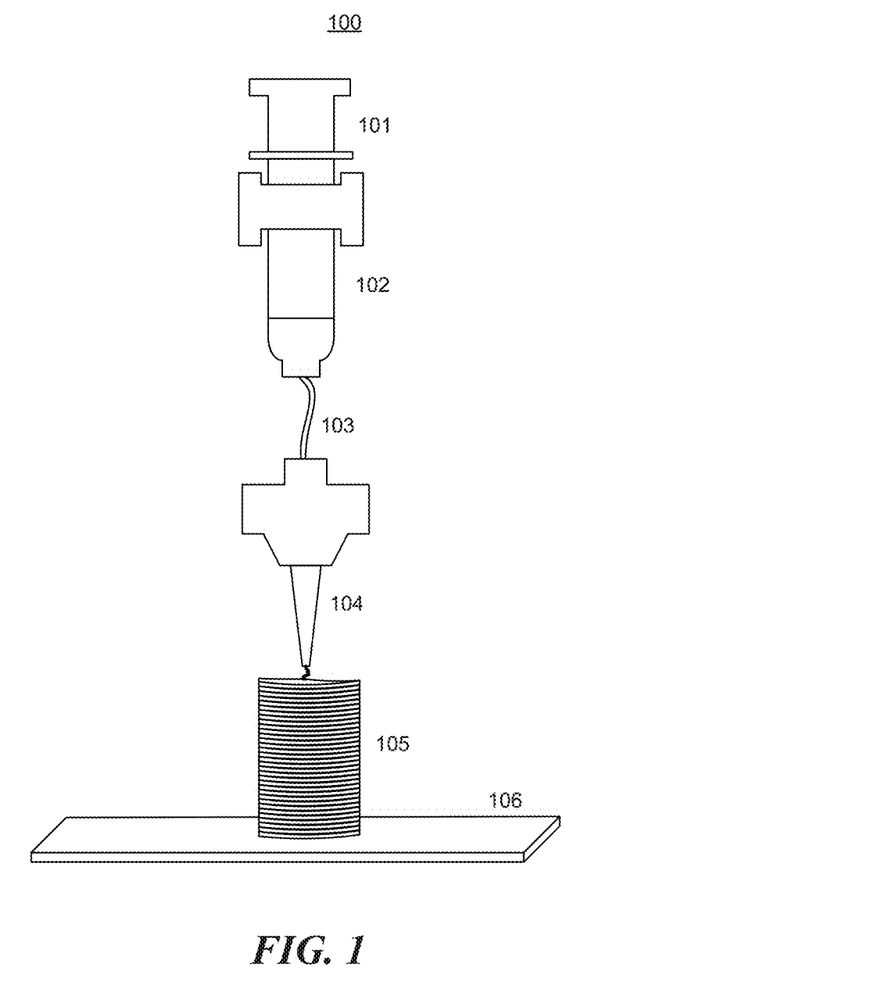
FIG. 1 is a schematic diagram that illustrates a DIW printing device in some embodiments.

FIG. 1 is a schematic diagram that illustrates a DIW printing device in some embodiments. The DIW printing device 100 employs viscoelastic inks that flow under shear forces and are dispensed through a nozzle to manufacture a product 105. The DIW printing device includes a plunger 101, a syringe reservoir 102, a tube 103, a nozzle 104, and a stage 106. The ink is stored in the syringe reservoir. The plunger pushes the ink toward the tube, which causes the ink to flow under shear forces through the nozzle and to be extruded on the stage to manufacture the product layer-by-layer. The nozzle can move horizontally and the stage can move vertically after each new layer is deposited.

Figure 2:
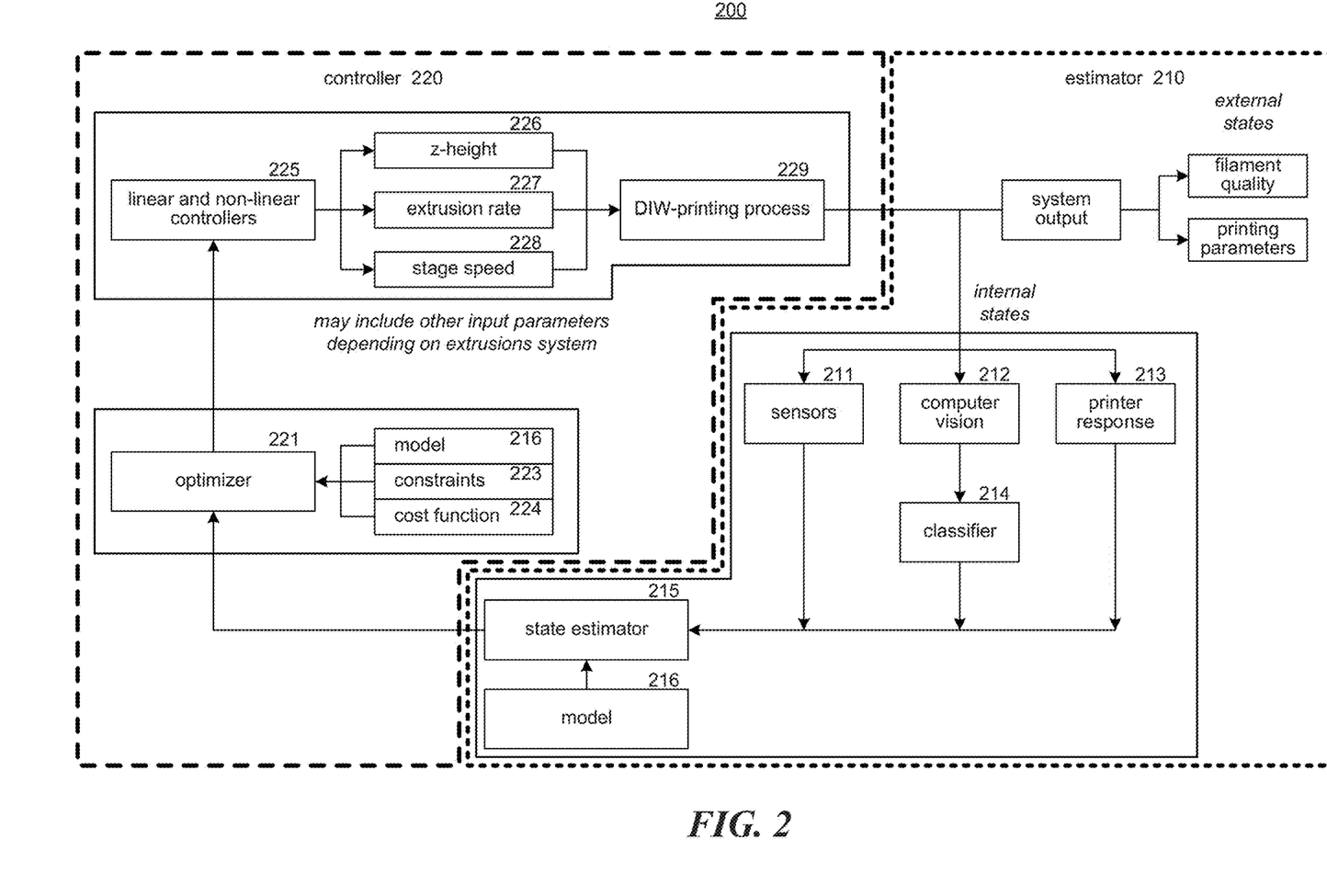
FIG. 2 is a block diagram that illustrates components of an EPC system in some embodiments.

FIG. 2 is a block diagram that illustrates components of the EPC system in some embodiments. The EPC system 200 includes an estimator 210 and a controller 220. The estimator includes various sensors 211 that measure extrusion and flow properties and printer responses 213 during operation of a material extrusion device. The estimator also includes a computer vision component 212 and a classifier 214 that are used to analyze images of the extruded filament during operation of the material extrusion device. The EPC system applies the classifier to the collected images to label the images with image-derived state data that indicates the presence of air bubbles, clogs, or other disturbances. A state estimator 215 then applies a model 216 to the outputs of the sensors and classifier to estimate a derived state that includes variables that cannot be directly obtained from the measurements or labeled images.

The controller includes an optimizer 221 that employs the model to calculate control parameters that minimize a cost function 224 based on constraints 223 of the material extrusion device. The control parameters include z-height 226, extrusion rate 227, and stage speed 228. The optimizer provides the control parameters to linear and non-linear controllers 225 of the material extrusion device to control the DIW printing process 229.

The controller may employ one or more optimal control algorithms for the optimization of the control parameters. These include, but are not limited to, model predictive control (MPC), robust-optimal control, linear quadratic Gaussian (LQG) regulator, and proportional-integral-derivative (PID) controller. Each type of control algorithm has specific advantages. For example, MPC relies on dynamic models of a process (e.g., linear empirical models obtained by building mathematical models of the process from measured data). The main advantages of MPC are its ability to handle constraints and changes in system parameters, anticipate future events, and take control actions accordingly.

The components of the EPC system may execute on computing systems that may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The training of classifiers may be performed on servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements components of the EPC system. The data transmission media is used for transmitting data via transitory, propagating signals or carrier waves (e.g., electromagnetism) via a wired or wireless connection.

The EPC system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the EPC system may be implemented in hardware using, for example, an application-specific integrated circuit (ASIC) or field programmable gate array ("FPGA").

Figure 3:
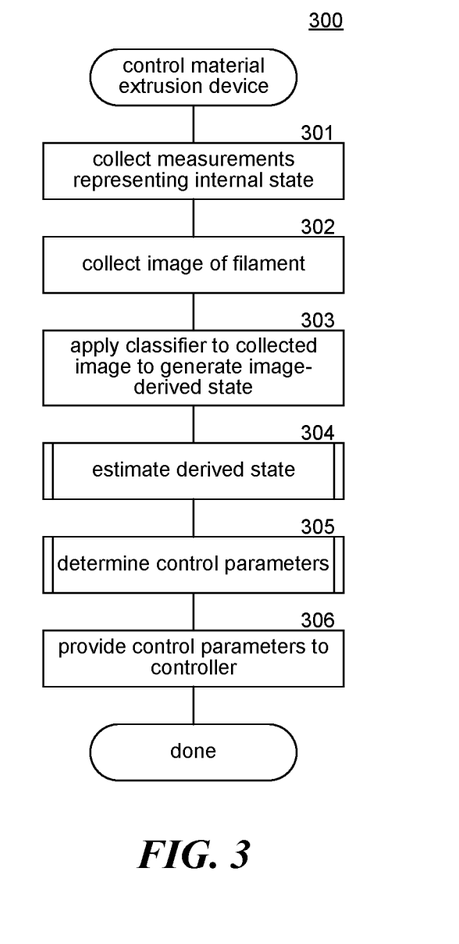
FIG. 3 is a flow diagram that illustrates the overall processing of the EPC system in some embodiments.

FIG. 3 is a flow diagram that illustrates the overall processing of an EPC system in some embodiments. An EPC system 300 monitors and controls operation of a material extrusion device (e.g., a DIW printer) to manufacture a product. In block 301, the EPC system collects one or more measurements, each representing an internal state of material extrusion processing during operation of the material extrusion device. The measurements may include linear displacement of the plunger, flowrate, current supply to the actuator, force applied to the plunger, and printer responses such as stage velocity, nozzle position, and linear actuator displacement velocity. In block 302, the EPC system collects an image of the filament as it is being extruded. In block 303, the EPC system applies a classifier to the collected image to generate an image-derived state. The image-derived state may include thickness, continuity, color, area, perimeter, defects, and other metrics that characterize the filament. In block 304, the EPC system estimates a derived state using a model based on the internal state and the image-derived state. In block 305, the EPC system uses the model to calculate control parameters (e.g., z-height, extrusion rate, and stage speed) that minimize a cost function based on constraints of the material extrusion device (e.g., how much force can be applied by the plunger, how fast the nozzle can move, etc.). In block 306, the EPC system provides the control parameters to a controller of the material extrusion device to make the necessary control moves to achieve a desired filament quality and/or total printing time.

Figure 4:
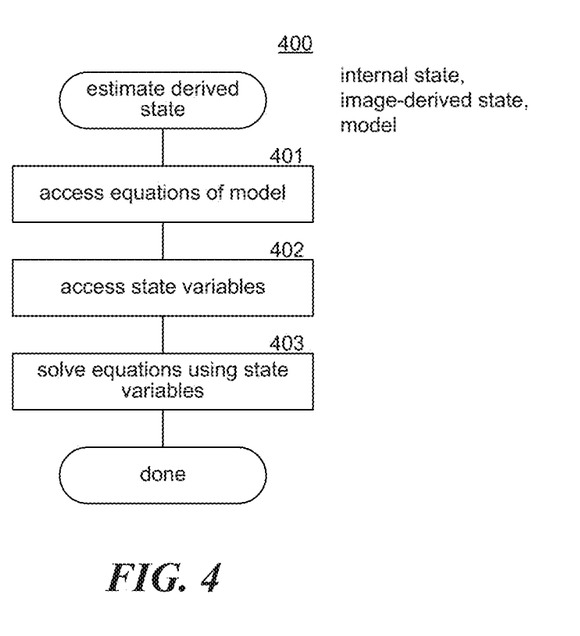
FIG. 4 is a flow diagram that illustrates the processing of an estimate derived state component of the EPC system in some embodiments.

FIG. 4 is a flow diagram that illustrates the processing of an estimate derived state component of the EPC system in some embodiments. The estimate derived state component 400 is invoked passing an internal state (including printer responses), an image-derived state, and a model, and estimates a derived state that includes variables that cannot be directly measured or obtained (e.g., the shear stress within the tubing and nozzle, the friction on the servo dynamics, and the friction of the plunger sliding against the wall of the syringe, etc.). In block 401, the component accesses equations of the model. The equations describe relationships between state variables, such as how the input current relates to the dispenser force and plunger velocity. In block 402, the component accesses variables of the input states that have been obtained from the sensors and the classifier. In block 403, the component solves the equations using these state variables to derive variables that represent the derived state, and then completes.

Figure 5:
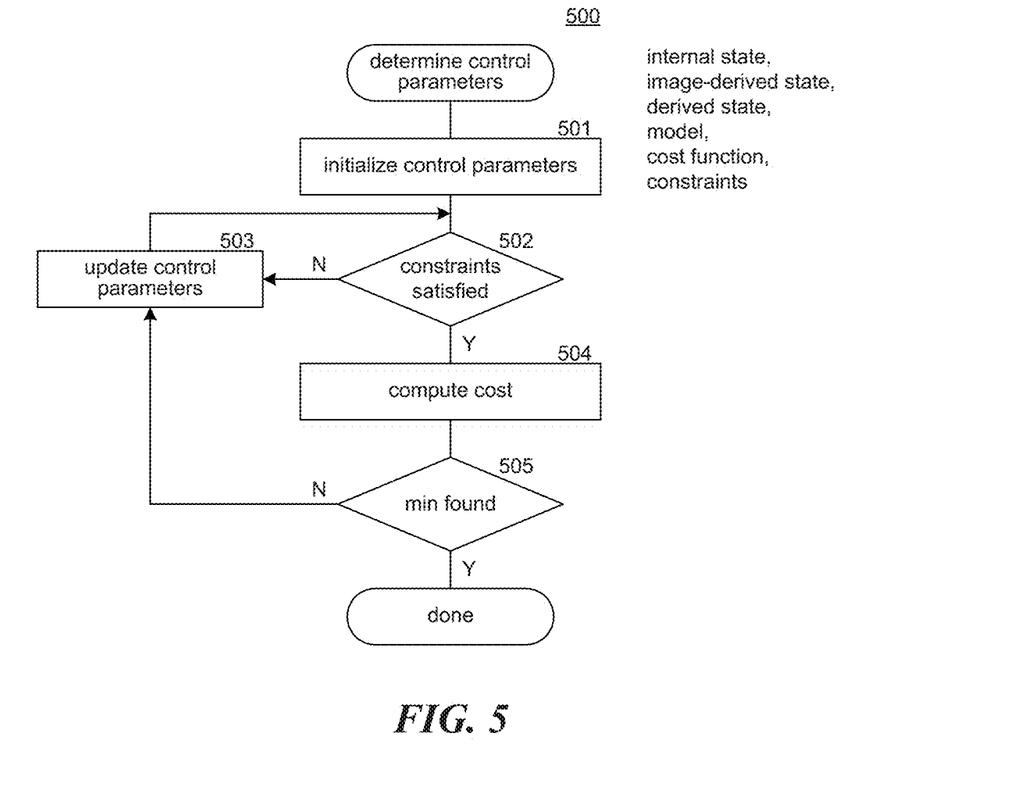
FIG. 5 is a flow diagram that illustrates the processing of a determine control parameters component of the EPC system in some embodiments.

FIG. 5 is a flow diagram that illustrates the processing of a determine control parameters component of the EPC system in some embodiments. The determine control parameters component 500 is invoked passing an internal state, an image-derived state, a derived-state, a model, a cost function, and constraints of the material extrusion device, and determines optimal control parameters (e.g., z-height, extrusion rate, and stage speed) to achieve a desired filament quality and/or total printing time. In block 501, the component initializes the control parameters using the model based on the input states. In blocks 502-505, the component loops finding values of the control parameters that satisfy the constraints of the material extrusion device and minimize the cost function. In decision block 502, if the control parameters satisfy the constraints of the material extrusion device, the component continues at block 504, else the component continues at block 503. In block 503, the component updates the control parameters and then loops to decision block 502 to check if the updated parameters satisfy the constraints. In block 504, the component computes the cost associated with the control parameters using the cost function. The cost represents the difference between the filament quality and/or total printing time that can be achieved with the control parameters and the desired filament quality and/or total printing time. In decision block 505, if the minimum cost is found, the component completes, else the component continues at block 503 to update the control parameters.

The following paragraphs describe various embodiments of aspects of the EPC system. An implementation of the EPC system may employ any combination of the embodiments. The processing described below may be performed by a computing device with a processor that executes computer-executable instructions stored on a computer-readable storage medium that implements the EPC system.

In some embodiments, a method performed by one or more computing systems is provided for controlling a material extrusion device to extrude a filament of an ink to manufacture a product. The method collects one or more measurements from one or more sensors that monitor material extrusion processing of the material extrusion device. Each measurement represents an internal state of the material extrusion processing during extrusion of the filament. Additionally, the method collects an image of the filament as the filament is extruded. The method then applies a classifier to the collected image to generate an image-derived state characterizing the filament. The classifier is trained with training data that include images labeled with image-derived state data. The method estimates a derived state of the material extrusion processing using a model based on the internal state and the image-derived state. The method determines control parameters using the model to achieve a desired quality of the filament by minimizing a cost function based on the internal state, the image-derived state, the derived state, and constraints of the material extrusion device. The method provides the control parameters to a controller of the material extrusion device.

In some embodiments, the material extrusion device comprises an actuator, a plunger, a syringe, a tube, a nozzle, and a stage. The cost function represents a cost of not matching a blue print for the product being manufactured. The blue print specifies one or more of a desired cross-sectional shape of the filament, a desired spacing between filament cylinders, and a desired total printing time. The constraints of the material extrusion device include how much force can be applied by the plunger or how fast the nozzle can move. In some embodiments, the images of the training data are collected during operation of the material extrusion device as it manufactures products. In some embodiments, the classifier uses a convolutional neural network. In some embodiments, the model employs mathematical equations. The mathematical equations vary depending on a configuration of the material extrusion device.

In some embodiments, one or more computing systems are provided for identifying a control move for controlling a material extrusion device to extrude a filament of an ink to manufacture a product. The one or more computing systems include one or more computer-readable storage mediums storing computer-executable instructions and one or more processors for executing the computer-executable instructions stored in the one or more computer-readable storage mediums. The computer-executable instructions control the one or more computing systems to collect one or more measurements from one or more sensors that monitor material extrusion processing of the material extrusion device. Each measurement represents an internal state of the material extrusion processing during extrusion of the filament. The computer-executable instructions further control the one or more computing systems to collect an image of the filament as the filament is extruded, apply a classifier to the collected image to generate an image-derived state characterizing the filament, estimate a derived state of the material extrusion processing based on the internal state and the image-derived state, and determine a control move based on the internal state, the image-derived state, and the derived state.

In some embodiments, the control move is further identified based on constraints of the material extrusion device. The one or more computing systems employ one or more of a model predictive control (MPC), a robust-optimal control, a linear quadratic Gaussian (LQG) regulator, and a proportional-integral-derivative (PID) controller to determine the control move. In some embodiments, the control move indicates to move the nozzle away from the product and dump the ink until a disturbance passes. The disturbance includes, for example, an air bubble or a clog. In some embodiments, the control move indicates to adjust one or more of an extrusion rate, a stage speed, a z-height, and UV-light modulation. The computer-executable instructions to determine the control move further control the one or more computing systems to minimize a cost function. In some embodiments, the cost function represents a difference between a measured shape of the filament and a desired shape of the filament. The classifier is trained with training data that include images labeled with image-derived state data.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the EPC system may be used for automated monitoring and control to inform proper functioning of extrusion-based printing. As another example, the EPC system may be used for simultaneous control of multiple systems for sophisticated methods of extrusion-based printing, such as UV-curing, non-continuous toolpaths, simultaneous printing of multiple inks, and optimal extrusion for varying filament quality. As another example, the EPC system may be used to develop 3D printing sensors for rheological measurements, interferometry measurements of ink displacement, filament composition monitoring, filament temperature control, ferromagnetic-fluid control, and filament quality control. Accordingly, the invention is not limited except as by the appended claims.

We claim:

1. A method performed by one or more computing systems for controlling a material extrusion device to extrude a filament of an ink to manufacture a product, the method comprising:

collecting one or more measurements from one or more sensors that monitor material extrusion processing of the material extrusion device, each measurement representing an internal state of the material extrusion processing during extrusion of the filament;

collecting an image of a portion of the filament while the filament is being extruded and while the portion of the filament is in motion and not in contact with any surface;

applying a classifier to the collected image of the filament as the filament is extruded, to generate an image-derived state characterizing the filament, the classifier being trained with training data that include images labeled with image-derived state data;

estimating a derived state of the material extrusion processing using a model based on the internal state and the image-derived state;

determining control parameters using the model to achieve a desired quality of the filament by minimizing a cost function based on the internal state, the image-derived state, the derived state, and constraints of the material extrusion device; and providing the control parameters to a controller of the material extrusion device.

2. The method of claim 1 wherein the material extrusion device comprises an actuator, a plunger, a syringe, a tube, a nozzle, and a stage.

3. The method of claim 1 wherein the cost function represents a cost of not matching a blue print for the product being manufactured, the blue print specifying one or more of a desired cross-sectional shape of the filament, a desired spacing between filament cylinders, or a desired total printing time.

4. The method of claim 1 wherein the constraints of the material extrusion device include how much force can be applied by a plunger or how fast the nozzle can move.

5. The method of claim 1 wherein the images of the training data are collected during operation of the material extrusion device as it manufactures products.

6. The method of claim 1 wherein the classifier uses a convolutional neural network.

7. The method of claim 1 wherein the model employs mathematical equations.

8. The method of claim 7 wherein the mathematical equations vary depending on a configuration of the material extrusion device.

9. One or more computing systems for identifying a control move for controlling a material extrusion device to extrude a filament of an ink to manufacture a product, the one or more computing systems comprising:
one or more computer-readable storage mediums storing computer-executable instructions for controlling the one or more computing systems to:
collect one or more measurements from one or more sensors that monitor material extrusion processing of the material extrusion device, each measurement representing an internal state of the material extrusion processing during extrusion of the filament;
collect an image of a portion of the filament while the filament is being extruded and while the portion of the filament is in motion and not in contact with any surface;
apply a classifier to the collected image of the filament as the filament is extruded, to generate an image-derived state characterizing the filament;
estimate a derived state of the material extrusion processing based on the internal state and the image-derived state; and
determine a control move based on the internal state, the image-derived state, and the derived state; and
one or more processors for executing the computer-executable instructions stored in the one or more computer-readable storage mediums.

10. The one or more computing systems of claim 9 wherein the control move is further identified based on constraints of the material extrusion device.

11. The one or more computing systems of claim 9 wherein the one or more computing systems employ one or more of a model predictive control (MPG), a robust-optimal control, a linear quadratic Gaussian (LQG) regulator, and a proportional—integral—derivative (PID) controller to determine the control move.

12. The one or more computing systems of claim 9 wherein the control move indicates to move a nozzle away from the product and dump the ink until a disturbance passes.

13. The one or more computing systems of claim 12 wherein the disturbance includes an air bubble or a clog.

14. The one or more computing systems of claim 9 wherein the control move indicates to adjust one or more of an extrusion rate, a stage speed, a z-height, and UV-light modulation.

15. The one or more computing systems of claim 9 wherein the computer-executable instructions to determine the control move further control the one or more computing systems to minimize a cost function.

16. The one or more computing systems of claim 15 wherein the cost function represents a difference between a measured shape of the filament and a desired shape of the filament.

17. The one or more computing systems of claim 9 wherein the classifier is trained with training data that include images labeled with image-derived state data.

\* \* \* \* \*